United States Patent
Alexander et al.

(10) Patent No.: US 12,282,343 B1
(45) Date of Patent: Apr. 22, 2025

(54) DOCKING ORIENTATION DEVICE

(71) Applicant: International Business Machines Corporation, Armonk, NY (US)

(72) Inventors: John Stern Alexander, Hampstead, NC (US); Scott E. Schneider, Rolesville, NC (US); Richard Wayne France, Schaumburg, IL (US); Neil Delima, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 18/402,022

(22) Filed: Jan. 2, 2024

(51) Int. Cl.
 *G05D 1/661* (2024.01)
 *G05D 1/243* (2024.01)
 *G05D 1/244* (2024.01)
 *G05D 111/10* (2024.01)

(52) U.S. Cl.
 CPC ............ *G05D 1/661* (2024.01); *G05D 1/243* (2024.01); *G05D 1/244* (2024.01); *G05D 2111/10* (2024.01)

(58) Field of Classification Search
 CPC .... G05D 1/661; G05D 2111/10; G05D 1/244; B64G 1/646; B64G 1/6462; B64G 1/6464
 See application file for complete search history.

(56) References Cited

U.S. PATENT DOCUMENTS 3,821,697 A 6/1974 Brown
3,910,533 A * 10/1975 Cheatham ............ B64G 1/6462
 244/172.4
4,064,424 A 12/1977 Hergenrother
5,943,476 A * 8/1999 Dougherty ............. B25J 9/1694
 700/251
6,293,678 B1 9/2001 Schieferstein
8,047,149 B1 11/2011 Antonelli et al.
9,878,779 B2 1/2018 Tsai
(Continued)

FOREIGN PATENT DOCUMENTS

CN 108460804 A 8/2018
CN 113759943 A 12/2021
WO 2020181329 A1 9/2020

OTHER PUBLICATIONS

International Docking System Standard (IDSS) Interface Definition Document (IDD) Revision D, Apr. 30, 2015. https://www.internationaldockingstandard.com/download/IDSS_IDD_Revision_D_043015.pdf (Year: 2015).*

(Continued)

*Primary Examiner* — Jess Whittington
*Assistant Examiner* — Jisun Choi
(74) *Attorney, Agent, or Firm* — Yee & Associates, P.C.

(57) ABSTRACT

Autonomously aligning docking bodies is provided. A first-axis surface is identified as a target axis surface corresponding to a desired docking approach vector of a first body to a second body. The first body is maneuvered to align relative to a second-axis surface until a third-axis surface is less than a defined surface detection threshold level. The first body is continued to be maneuvered to align relative to the third-axis surface until the second-axis surface is less than the defined surface detection threshold level. Docking is completed between the first body and the second body in accordance with the desired docking approach vector based on alignment of the first body with the target axis surface.

20 Claims, 8 Drawing Sheets

(56) References Cited

U.S. PATENT DOCUMENTS

| | | |
|---|---|---|
| 10,007,272 B2 | 6/2018 | Tirpak et al. |
| 2018/0237161 A1 | 8/2018 | Minnick et al. |
| 2019/0187724 A1 | 6/2019 | Li et al. |
| 2021/0107682 A1 | 4/2021 | Kozlenko et al. |
| 2021/0269174 A1 | 9/2021 | Shuff |
| 2022/0127014 A1 | 9/2022 | Cowden |

OTHER PUBLICATIONS

Breivik et al., "A Virtual Target-Based Underway Docking Procedure for Unmanned Surface Vehicles," IFA Proceedings Volumes, Jan. 2011, pp. 13630-13635, vol. 44, Issue 1, Elsevier Ltd., accessed Dec. 13, 2023, https://www.sciencedirect.com/science/article/pii/S1474667016458143.

Hart, "Engineer Builds Automatic Tesla Charger," Science & Tech, Jun. 16, 2021, 3 pages, Nerdist, accessed Nov. 28, 2023, https://nerdist.com/article/homemade-automatic-tesla-charger/.

Sun et al, "Deep submergence rescue vehicle docking based on parameter adaptive control with acoustic and visual guidance," International Journal of Advanced Robotic Systems, Apr. 22, 2020, pp. 1-14, Sage Publications Ltd., accessed Dec. 1, 2023, https://journals.sagepub.com/doi/10.1177/1729881420919955.

\* cited by examiner

DOCKING ORIENTATION DEVICE

BACKGROUND

The disclosure relates generally to docking and more specifically to aligning docking bodies.

Docking is the joining of two separate bodies (e.g., a space station and a supply module, automated mating of fuel or supply hose/connector and fuel receptacle, and the like) without external assistance. The connection created by the joining of the two bodies can be temporary or permanent. Docking operations depend on an ability of the two bodies to find each other.

SUMMARY

According to one illustrative embodiment, a computer-implemented method for autonomously aligning docking bodies is provided. A navigation system of a first body identities a first-axis surface of three optically distinct axes surfaces of a docking orientation device that is a target axis surface corresponding to a desired docking approach vector of the first body to a second body. The navigation system maneuvers the first body to align with the docking orientation device relative to a second-axis surface of the three optically distinct axes surfaces until a third-axis surface of the three optically distinct axes surfaces is less than a defined surface detection threshold level. The navigation system continues maneuvering of the first body to align with the docking orientation device relative to the third-axis surface of the three optically distinct axes surfaces until the second-axis surface of the three optically distinct axes surfaces is less than the defined surface detection threshold level. The navigation system completes docking between the first body and the second body in accordance with the desired docking approach vector based on alignment of the first body with the target axis surface of the docking orientation device. According to other illustrative embodiments, a computer system and computer program product for autonomously aligning docking bodies are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
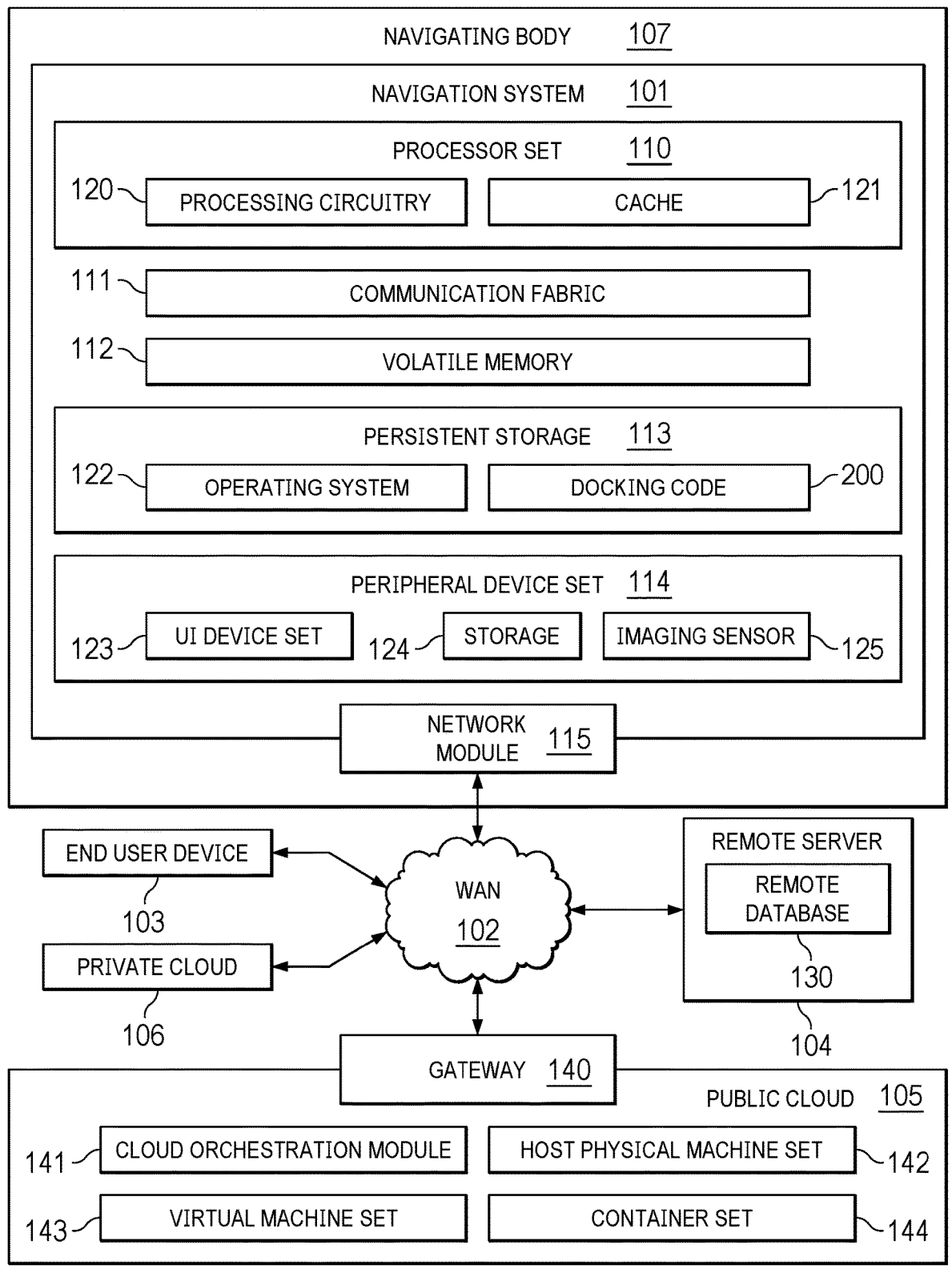
FIG. 1 is a pictorial representation of a computing environment in which illustrative embodiments may be implemented.
Figure 2:
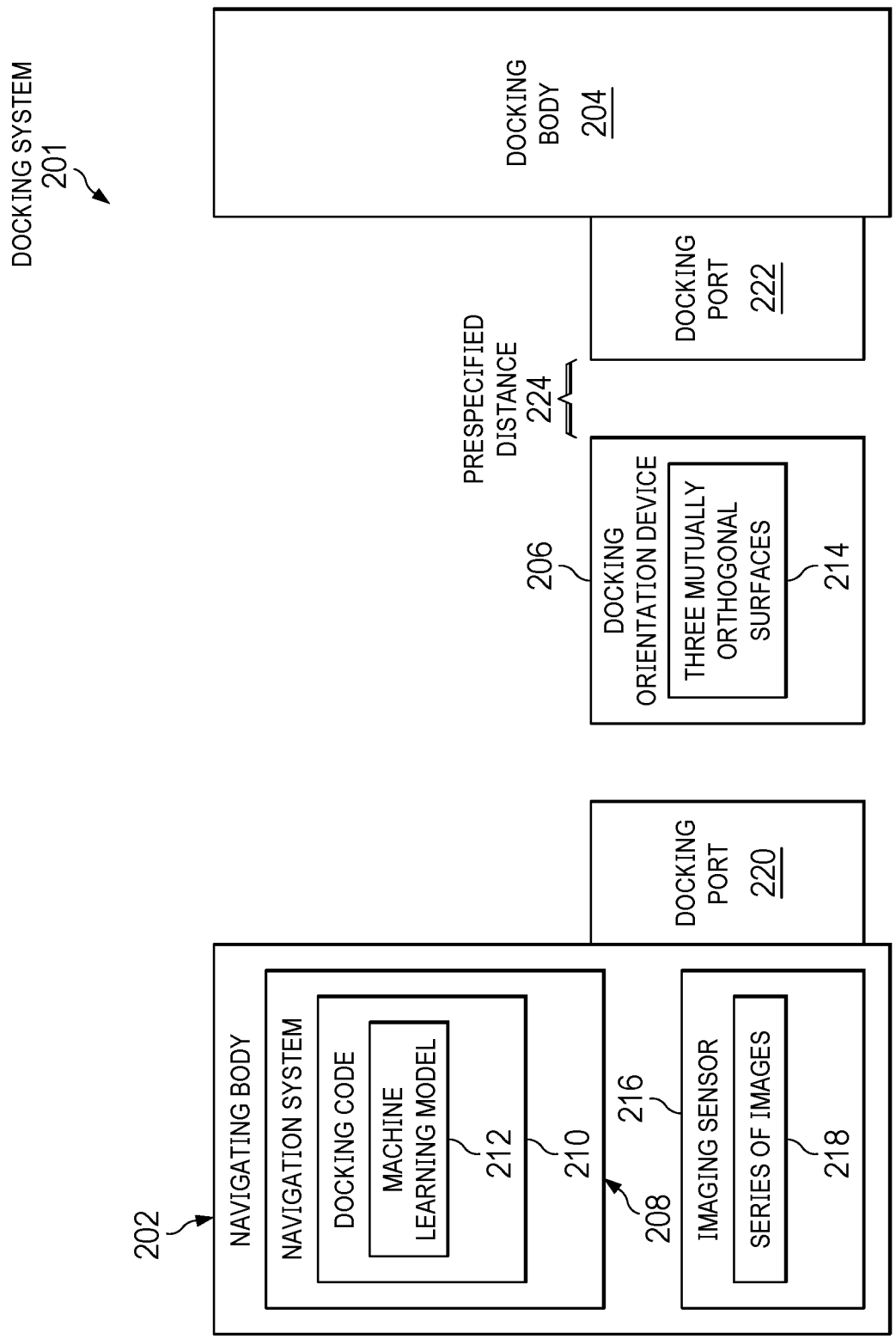
FIG. 2 is a diagram illustrating an example of a docking system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as docking code 200. For example, docking code 200 determines the orientation of a navigating body, such as navigating body 107, relative to a docking orientation device corresponding to a docking body. Navigating body 107 can be, for example, a land craft, watercraft, aircraft, spacecraft, or the like. The docking body can be either stationary (e.g., a loading dock, fuel depot, or the like) or moving (e.g., a satellite, space station, jet, submarine, or the like). The docking orientation device can be physically coupled to the docking body, or alternatively the docking orientation device can be separate from the docking body (e.g., not physically coupled to the docking body). The docking orientation device is a three-dimensional object having a geometric shape, such as, for example, a semi-sphere, sphere, cube, cylinder, or the like, that includes three mutually orthogonal surfaces. In other words, the three mutually orthogonal surfaces are positioned at 90 degrees to each other. Each respective surface of the three mutually orthogonal surfaces is optically distinct from each other in appearance using, for example, at least one of different colors, patterns, graphics, designs, pictures, and the like. Docking code 200 can optionally utilize holographic techniques to distinguish the different surfaces of the docking orientation device by generating an array of the three-dimensional geometric shape of the docking orientation device with the three mutually orthogonal surfaces.

Navigation system 101 of navigating body 107 utilizes docking code 200 to achieve an optical alignment of navigating body 107 to the docking orientation device based on one or more characteristics derived from an optical response of imaging sensor 125 (e.g., a camera) observing (e.g., capturing a series of images of) the docking orientation device. The optical response includes optical distinction between the three mutually orthogonal surfaces that encode navigation control information, along with other information that is revealed depending on the angle of view of a given surface of the three mutually orthogonal surfaces of the docking orientation device. The other information can include the context of the docking operation (e.g., identification of the docking body, identification of the entity (e.g., governmental agency, organization, institution, enterprise, company, or the like) corresponding to the docking body, identification of a given port of a plurality of ports corresponding to the docking body, and the like).

Docking code 200 utilizes the three-dimensional geometric shape having the three mutually orthogonal and optically distinct surfaces to obtain a 360-degree view for determining the docking approach and successful docking. Thus, docking code 200 enables navigation system 101 to orient to the docking orientation device and obtain additional encoded information from different viewing angles of the different surfaces of the docking orientation device.

As an illustrative example, navigation system 101 knows that the docking orientation device is stationed, floating in zero gravity at a prespecified three-dimensional distance (e.g., 1 centimeter, 5 centimeters, 5 decimeters, 1 meter, 5 meters, 10 meters, or the like) from a docking port of a docking body (e.g., space station). In other words, the docking orientation device need not be physically attached to the docking port, only that navigation system 101 is aware of the exact location or position of the docking orientation device relative to the docking port. Navigation system 101 of navigating body 107, which needs to connect with the docking port of the docking body, uses docking code 200 to determine the approach to the docking port from any of 360 degrees, precisely knowing the orientation of navigating body 107 relative to the docking orientation device, which docking code 200 knows is at a prespecified three-dimensional distance (e.g., located 10 meters away) from the docking port of the docking body.

As a result, docking code 200 enables autonomous docking between any two bodies needing to be precisely oriented (e.g., shipping containers, refueling umbilical connections, and the like) because of the three mutually orthogonal and optically distinct surface design of the three-dimensional docking orientation device geometric shape whether on earth, in low earth orbit, in outer space, or on the moon or other planet.

In addition to navigation system 101 and docking code 200, computing environment 100 includes, for example, wide area network (WAN) 102, end user device (EUD) 103, remote server 104, public cloud 105, and private cloud 106. In this embodiment, navigation system 101 includes processor set 110 (including processing circuitry 120 and cache 121), communication fabric 111, volatile memory 112, persistent storage 113 (including operating system 122 and docking code 200, as identified above), peripheral device set 114 (including user interface (UI) device set 123, storage 124, and imaging sensor 125), and network module 115. Remote server 104 includes remote database 130. Public cloud 105 includes gateway 140, cloud orchestration module 141, host physical machine set 142, virtual machine set 143, and container set 144.

Navigation system 101 may take the form of any type of navigation system now known or to be developed in the future that is capable of, for example, running a program, accessing a network, and querying a database, such as remote database 130. It should be understood that performance of the computer-implemented method of illustrative embodiments can be distributed among multiple navigation systems. On the other hand, in this presentation of computing environment 100, detailed discussion is focused on a single navigation system, specifically navigation system 101, to keep the presentation as simple as possible. Navigation system 101 can be coupled to a cloud, but is not required to be coupled to a cloud.

Processor set 110 includes one, or more, processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

Computer-readable program instructions are typically loaded onto navigation system 101 to cause a series of operational steps to be performed by processor set 110 of navigation system 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in docking code 200 in persistent storage 113.

Communication fabric 111 is the signal conduction path that allows the various components of navigation system 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In navigation system 101, the volatile memory 112 is located in a single package and is internal to navigation system 101, but, alternatively or additionally, the volatile memory may be distributed over multiple packages and/or located externally with respect to navigation system 101.

Persistent storage 113 is any form of non-volatile storage for computers that is now known or to be developed in the future. The non-volatility of this storage means that the stored data is maintained regardless of whether power is being supplied to navigation system 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of navigation system 101. Data communication connections between the peripheral devices and the other components of navigation system 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. Imaging sensor 125 can represent a set of cameras and can include other types of sensors, such as, for example, a thermal sensor, a motion sensor, and the like.

Network module 115 is the collection of software, hardware, and firmware that allows navigation system 101 to communicate with other navigation systems, computers, and devices through WAN 102. Network module 115 may include hardware, such as network adapter cards or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to navigation system 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include hardware such as copper transmission cables, optical transmission fibers, wireless transmission, routers, firewalls, switches, gateway computers, and edge servers.

EUD 103 is any computer system that is used and controlled by an end user (e.g., a navigation system administrator that maintains navigation system 101). EUD 103 typically receives helpful and useful data from the operations of navigation system 101. For example, in a hypothetical case where navigation system 101 is designed to provide docking operation information to the end user, this docking operation information would typically be communicated from network module 115 of navigation system 101 through WAN 102 to EUD 103. In this way, EUD 103 can display, or otherwise present, the docking operation information to the end user. In some embodiments, EUD 103 may be a client device, such as thin client, heavy client, mainframe computer, desktop computer, laptop computer, tablet computer, smart phone, and so on.

Remote server 104 is any computer system that serves at least some data and/or functionality to navigation system 101. Remote server 104 may be controlled and used by the same entity that maintains navigation system 101. Remote server 104 represents the machine(s) that collect and store helpful and useful data for use by other navigation systems, such as navigation system 101.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Illustrative embodiments utilize object detection, spatial orientation, and navigation. Specifically, illustrative embodiments utilize a docking orientation device, which is characterized by a three-dimensional geometric shape, such as, for example, a spherical shape, semi-spherical shape, cubical shape, cylindrical shape, or the like, designed to simplify the calculation of three-dimensional spatial location based only on a series of images of the docking orientation device generated by an imaging sensor, such as, for example, a set of cameras, of a navigating body. As a result, illustrative embodiments eliminate the need for expensive sensor technologies, such as, light detection and ranging (LiDAR), radar, or the like, to perform and successfully complete a docking operation or procedure. Illustrative embodiments support six degrees of docking orientation freedom (e.g., forward/back; left/right; up/down; yaw; pitch; and roll).

Illustrative embodiments utilize, for example, a machine learning model, algorithmic process, or the like, which is trained to identify the docking orientation device as, for example, a circle, an ellipse, a square, or the like within an image of the docking orientation device captured by the imaging sensor. Illustrative embodiments further facilitate the differentiation of the docking orientation device using optically distinct surfaces (e.g., each respective surface has a different color, pattern, picture, design, graphic, or any combination thereof). The design or graphic can include, for example, a quick response code, bar code, or the like. In addition, it should be noted that the three mutually orthogonal and optically distinct surfaces do not need to intersect in the middle (e.g., at a center point of the three-dimensional geometric shape of the docking orientation device).

Illustrative embodiments utilize the ratio of each optically distinct surface to determine the angle of approach to the docking orientation device based on the focal plane of the imaging sensor. Consequently, using the optically distinct surfaces of the docking orientation device enables illustrative embodiments to determine alignment of the navigating body with the docking orientation device based on an analysis of the image of the docking orientation device, which significantly decreases the computational cost and complexity associated with spatial orientation and navigation. Alternatively, illustrative embodiment utilizes holographic techniques to distinguish the different surfaces of the docking orientation device in addition to, or instead of, colors, patterns, or the like.

Thus, illustrative embodiments can be utilized in a broad range of scenarios including, but not limited to, precision landing of unpiloted helicopters, marking stops for unmanned air taxis in urban air mobility scenarios, and guiding orientation of objects (e.g., supply containers, large equipment, expansion modules, and the like) in a zero-gravity environment. The docking orientation device is inexpensive, portable, completely passive having no power source, such as, for example, batteries, and can be affordably mass-produced. It should be noted that current docking solutions utilize, for example, infrared sensors, colored beacons, illumination beam projects, lasers, and the like, whereas illustrative embodiments utilize machine vision based on a faceted docking orientation device that reflects existing light requiring no power.

Therefore, illustrative embodiments provide one or more technical solutions that overcome a technical problem with an inability of current docking solutions to perform a docking operation using a passive device that does not have a power source. As a result, these one or more technical solutions provide a technical effect and practical application in the field of autonomous docking.

With reference now to FIG. 2, a diagram illustrating an example of a docking system is depicted in accordance with an illustrative embodiment. Docking system 201 is a system of hardware and software components for performing autonomous docking of different bodies.

In this example, docking system 201 includes navigating body 202 (e.g., a first body), docking body 204 (e.g., a second body), and docking orientation device 206. Navigating body 202 may be, for example, navigating body 107 in FIG. 1. Navigating body 202 includes navigation system 208, such as, for example, navigation system 101 in FIG. 1. Navigation system 208 includes docking code 210, such as, for example, docking code 200 in FIG. 1. In this example, docking code 210 includes machine learning model 212. Machine leaning model 212 is trained to recognize the geometric shape of docking orientation device 206, along with the three optically distinct surfaces of three mutually orthogonal surfaces 214.

Navigation system 208 utilizes imaging sensor 216 to capture series of images 218 of docking orientation device 206. Docking code 210 utilizes machine learning model 212 to analyze series of images 218 to determine alignment of navigating body 202 with a target surface of three mutually orthogonal surfaces 214 for a desired docking approach vector to connect docking port 220 of navigating body 202 with docking port 222 of docking body 204 based on prespecified three-dimensional distance 224 between docking orientation device 206 and docking port 222 of docking body 204. In this example, docking orientation device 206 is shown to be separate (i.e., not physically coupled to) docking body 204. However, in an alternative illustrative embodiment, docking orientation device 206 can be physically coupled to docking body 204.

It should be noted that FIG. 3, FIG. 4, FIG. 5, and FIG. 6 represent a series of images, such as, for example, series of images 218, of a same docking orientation device, such as, for example, docking orientation device 206, captured by an imaging sensor corresponding to a navigation system of a navigating body, such as, for example, imaging sensor 216 corresponding to navigation system 208 of navigating body 202, as the navigation system guides and maneuvers the navigating body to align with the docking orientation device for docking with the docking body.

Figure 3:
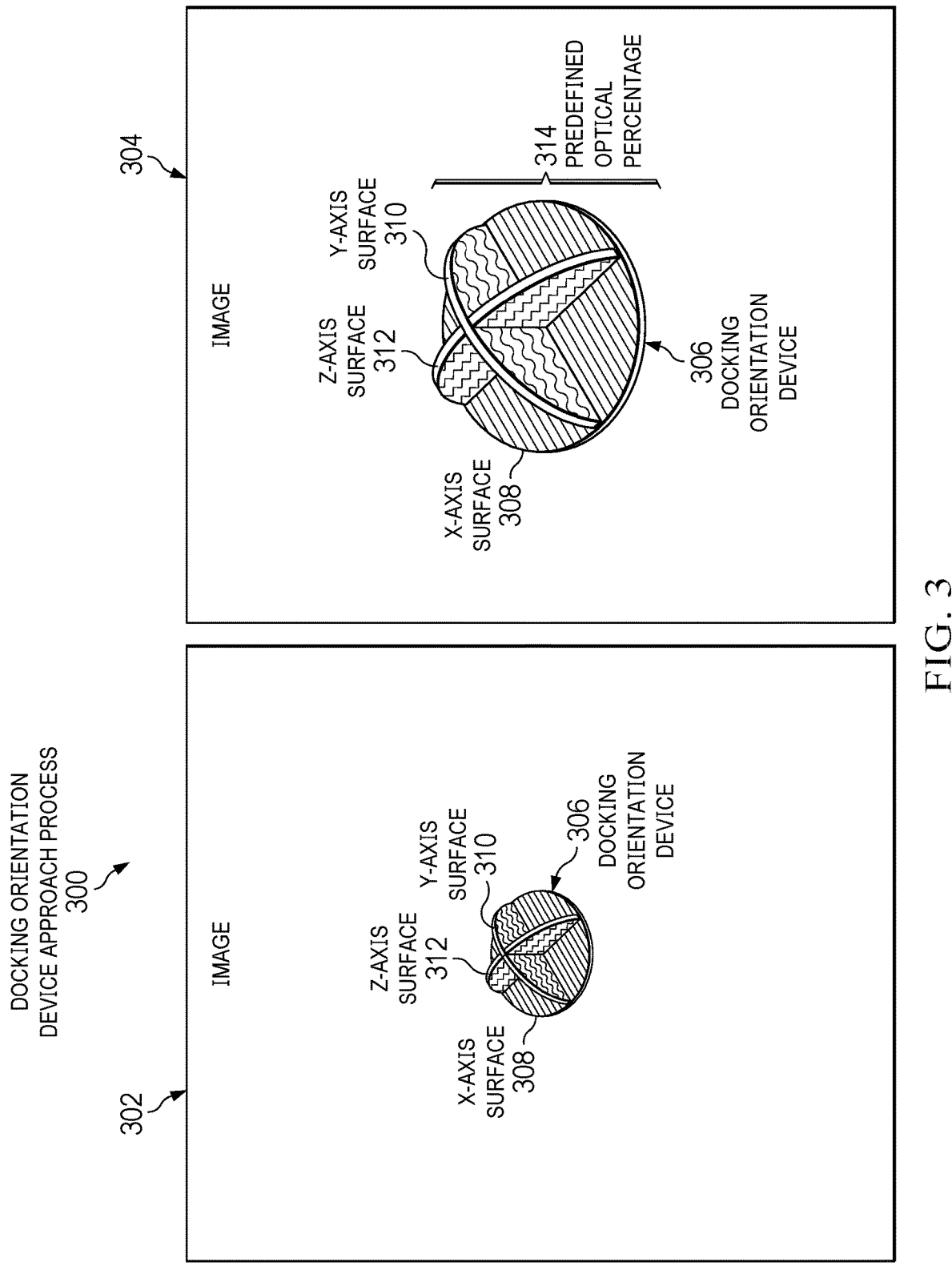
FIG. 3 is a diagram illustrating an example of a docking orientation device approach process in accordance with an illustrative embodiment.

With reference now to FIG. 3, a diagram illustrating an example of a docking orientation device approach process is depicted in accordance with an illustrative embodiment. In this example, docking orientation device approach process 300 includes image 302 and image 304 of docking orientation device 306. However, it should be noted that docking orientation device approach process 300 is intended as an example only and not as a limitation on illustrative embodiments. For example, docking orientation device approach process 300 can include any number of images.

A navigation system of a navigating body, such as, for example, navigation system 208 of navigating body 202 in FIG. 2, acquires docking orientation device 306 corresponding to a docking body, such as, for example, docking body 204 in FIG. 2, using an imaging sensor, such as, for example, imaging sensor 216 in FIG. 2. In this example, docking orientation device 306 has a three-dimensional geometric shape of a semi-sphere. However, it should be noted that docking orientation device 306 is intended as an example only and not as a limitation on illustrative embodiments. For example, docking orientation device 306 can have another three-dimensional geometric shape, such as, for example, a sphere, a cube, a cylinder, a pyramid, or the like.

The imaging sensor can include, for example, one camera or multiple cameras. The navigation system guides the navigating body in an approach to docking orientation device 306 of the docking body until the navigation system determines that a desired maneuvering distance has been achieved (e.g., when docking orientation device 306 captured in image 304 by the imaging sensor consumes predefined optical percentage 314 of image 304). In this example, predefined optical percentage 314 is approximately 15-20% of image 304. However, predefined optical percentage 314 may be, for example, 30%, 40%, 50%, 60%, 70%, or the like.

In response to achieving the desired maneuvering distance, the navigation system identifies the three visible axes surfaces (i.e., x-axis surface 308, y-axis surface 310, and z-axis surface 312) of docking orientation device 306 based on the optical distinctiveness (e.g., pattern, color, or the like) of each respective surface of the three mutually orthogonal surfaces comprising docking orientation device 306. For example, a first surface of the three mutually orthogonal surfaces of docking orientation device 306 can have straight lines representing x-axis surface 308, a second surface of the three mutually orthogonal surfaces of docking orientation device 306 can have wavey lines representing y-axis surface 310, and a third surface of the three mutually orthogonal surfaces of docking orientation device 306 can have zig-zag lines representing z-axis surface 312. Alternatively, the first surface of docking orientation device 306 can have a green color representing x-axis surface 308, the second surface can have a red color representing y-axis surface 310, and the third surface can have a blue color representing z-axis surface 312. In this example and in the following examples in FIGS. 4-6, the x-axis surface (e.g., the straight line surface or green color surface) of the docking orientation device is the desired docking approach vector of the navigation system of the navigating body. Up to 6 approach vectors are possible, but not all are needed for a docking operation.

Figure 4:
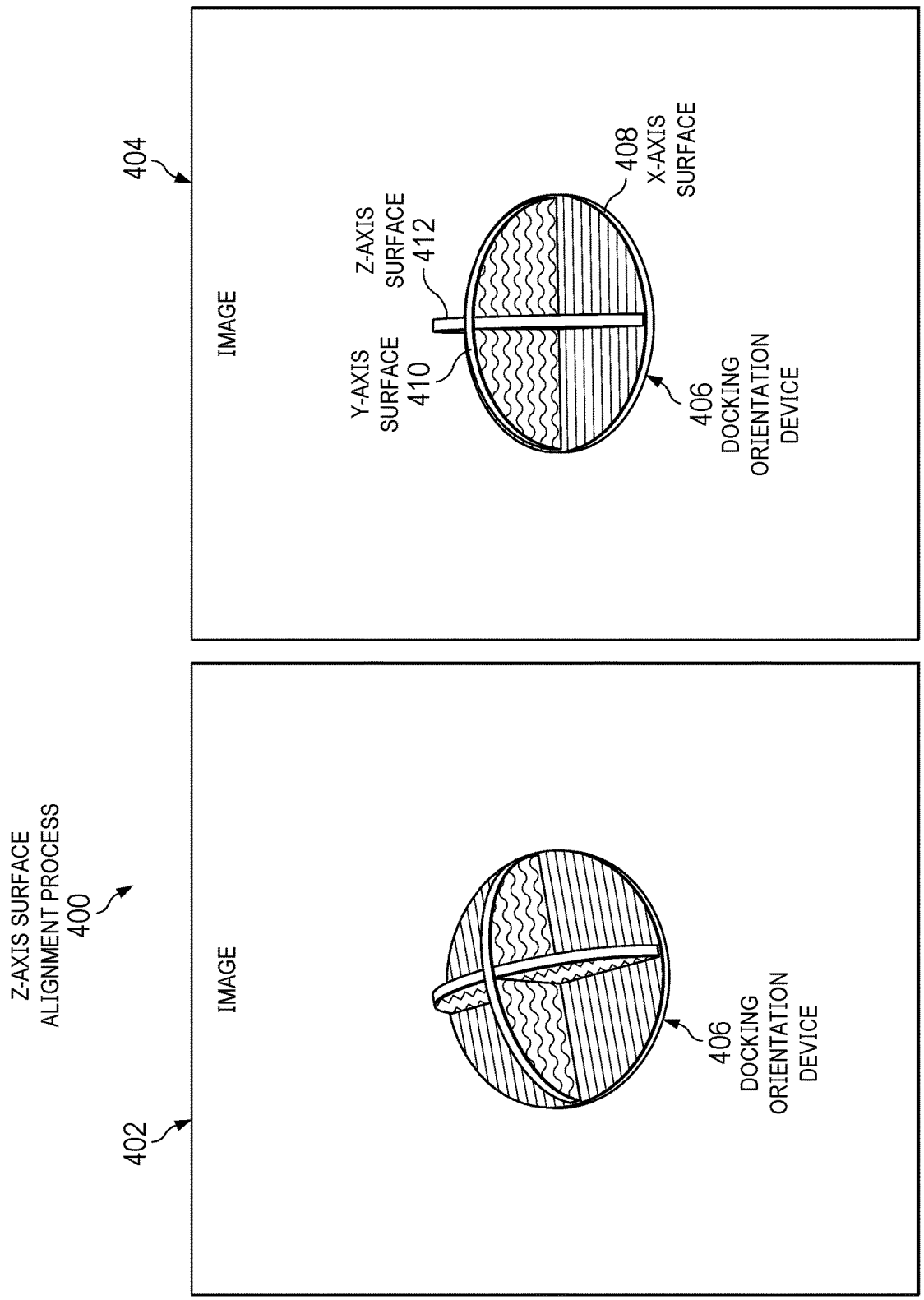
FIG. 4 is a diagram illustrating an example of a z-axis surface alignment process in accordance with an illustrative embodiment.

With reference now to FIG. 4, a diagram illustrating an example of a z-axis surface alignment process is depicted in accordance with an illustrative embodiment. In this example, z-axis surface alignment process 400 includes image 402 and image 404 of docking orientation device 406. It should be noted that docking orientation device 406 is the same as docking orientation device 306 in FIG. 3. Also, it should be noted that image 402 is similar to image 304 in FIG. 3.

The navigation system maneuvers the navigating body to align relative to a specified target surface to achieve the desired docking approach vector. In this example, the specified target surface is x-axis surface 408 (e.g., the straight line surface or green color surface). To achieve the desired docking approach vector, the navigation system starts maneuvering the navigating body to align with docking orientation device 406 relative to y-axis surface 410 (e.g., the wavey line surface or red color surface) until z-axis surface 412 (e.g., the zig-zag line surface or blue color surface) is less than a defined surface detection threshold level (e.g., z-axis surface 412 essentially disappears from view) in image 404 of docking orientation device 406 captured by the imaging sensor.

Figure 5:
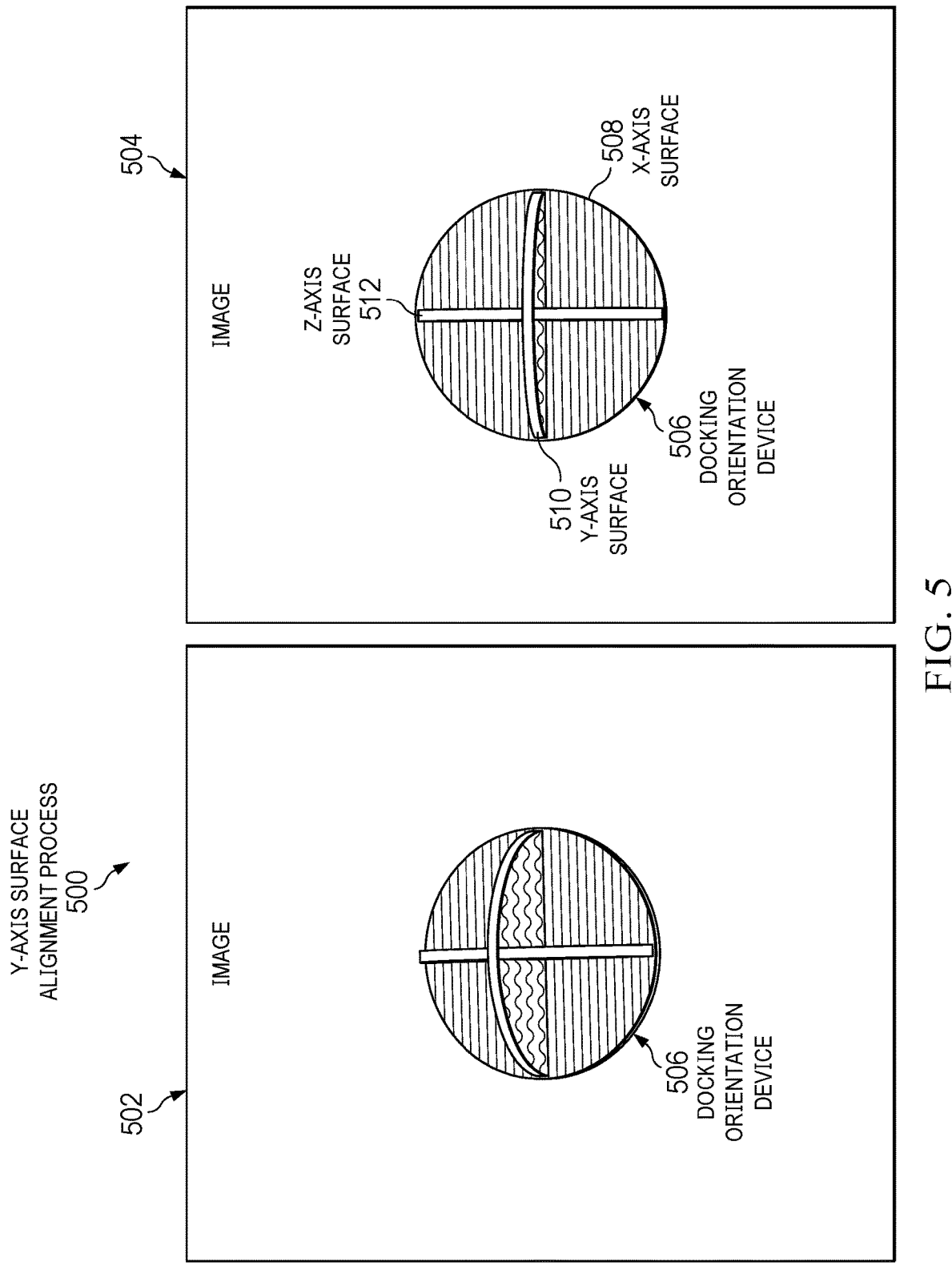
FIG. 5 is a diagram illustrating an example of a y-axis surface alignment process in accordance with an illustrative embodiment.

With reference now to FIG. 5, a diagram illustrating an example of a y-axis surface alignment process is depicted in accordance with an illustrative embodiment. In this example, y-axis surface alignment process 500 includes image 502 and image 504 of docking orientation device 506. It should be noted that docking orientation device 506 is the same as docking orientation device 406 in FIG. 4. Also, it should be noted that image 502 is similar to image 404 in FIG. 4.

In response to the navigation system detecting that z-axis surface 512 is less than the defined surface detection threshold level in image 502 of docking orientation device 506 captured by the imaging sensor, the navigation system maneuvers the navigation body to align with docking orientation device 506 relative to z-axis surface 512 (e.g., the zig-zag line surface or blue color surface) until y-axis surface 510 (e.g., the wavey line surface or red color surface) is less than the defined surface detection threshold level in image 504 of docking orientation device 506 captured by the imaging sensor. As a result, x-axis surface 508 of docking orientation device 506 is now essentially fully visible within image 504.

Figure 6:
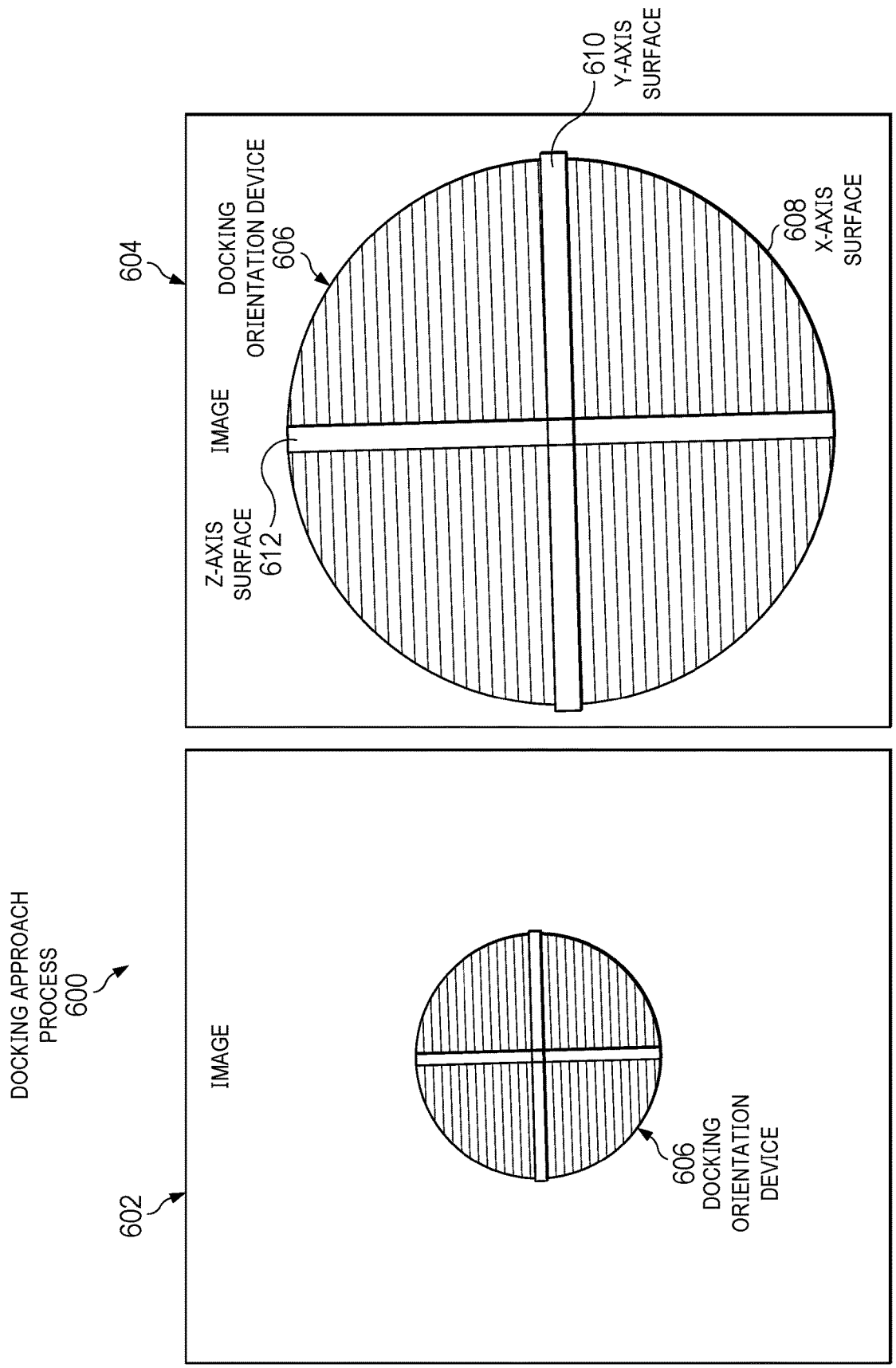
FIG. 6 is a diagram illustrating an example of a docking approach process in accordance with an illustrative embodiment.

With reference now to FIG. 6, a diagram illustrating an example of a docking approach process is depicted in accordance with an illustrative embodiment. In this example, docking approach process 600 includes image 602 and image 604 of docking orientation device 606. It should be noted that docking orientation device 606 is the same as docking orientation device 506 in FIG. 5. Also, it should be noted that image 602 is similar to image 504 in FIG. 5.

In response to the navigation system detecting that both z-axis surface 612 and y-axis surface 610 are less than the defined surface detection threshold level in image 602 of docking orientation device 606 captured by the imaging sensor, the navigation system determines that the focal plane of the imaging sensor is aligned relative to target x-axis surface 608 of docking orientation device 606. Afterward, the navigation system continues the approach of the navigating body to docking orientation device 606 as shown in image 604 with an error function of a thickness of the three mutually orthogonal surfaces and a resolution of the imaging sensor. In other words, the navigation system matches the resolution of the imaging sensor with the thickness of the three mutually orthogonal surfaces. Finally, the navigation system completes the docking operation between the navigating body and the docking body based on a correct orientation with target x-axis surface 608 of docking orientation device 606 corresponding to the docking body.

Figure 7A:
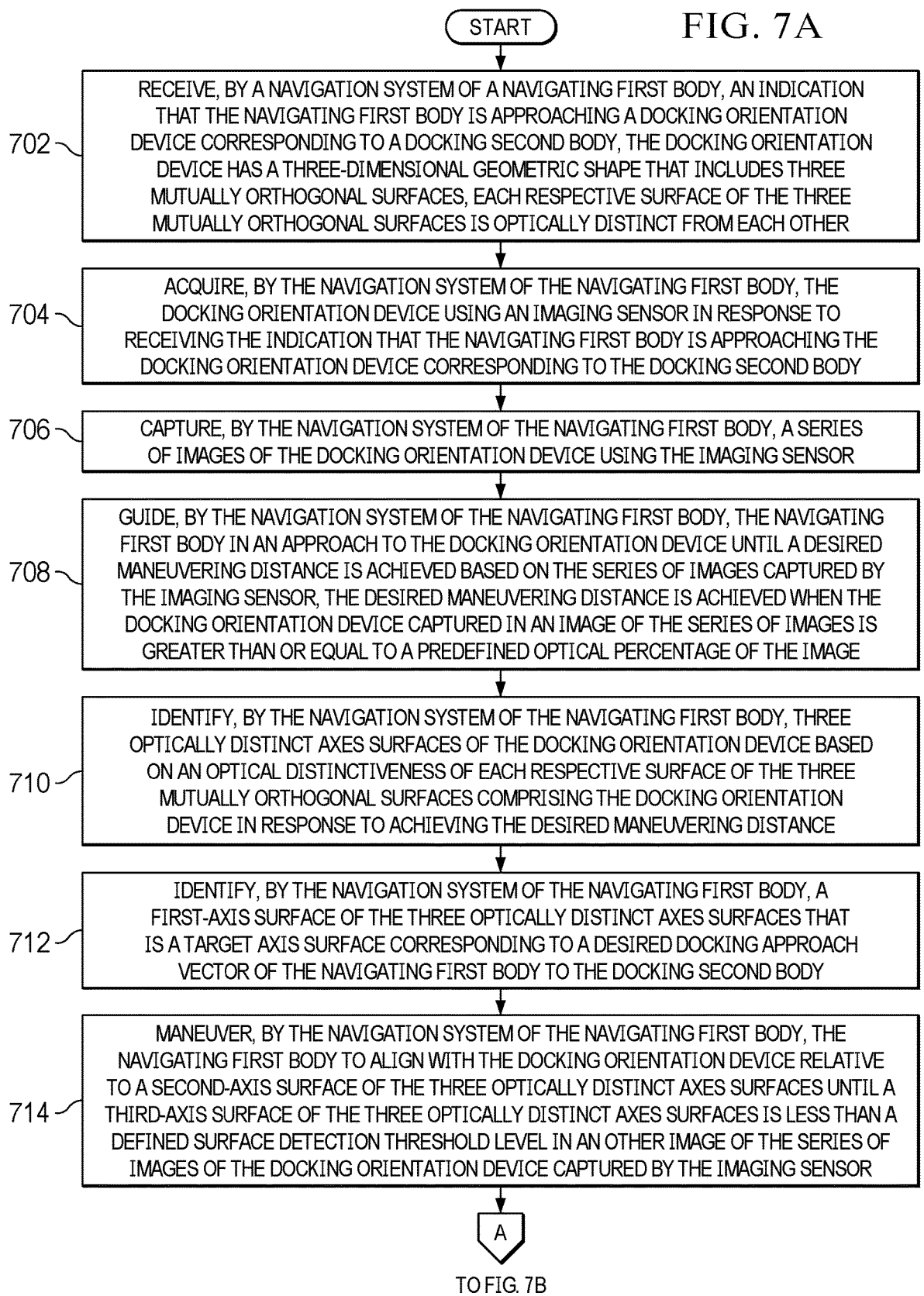
FIGS. 7A-7B are a flowchart illustrating a process for autonomously aligning docking bodies in accordance with an illustrative embodiment.
Figure 7B:
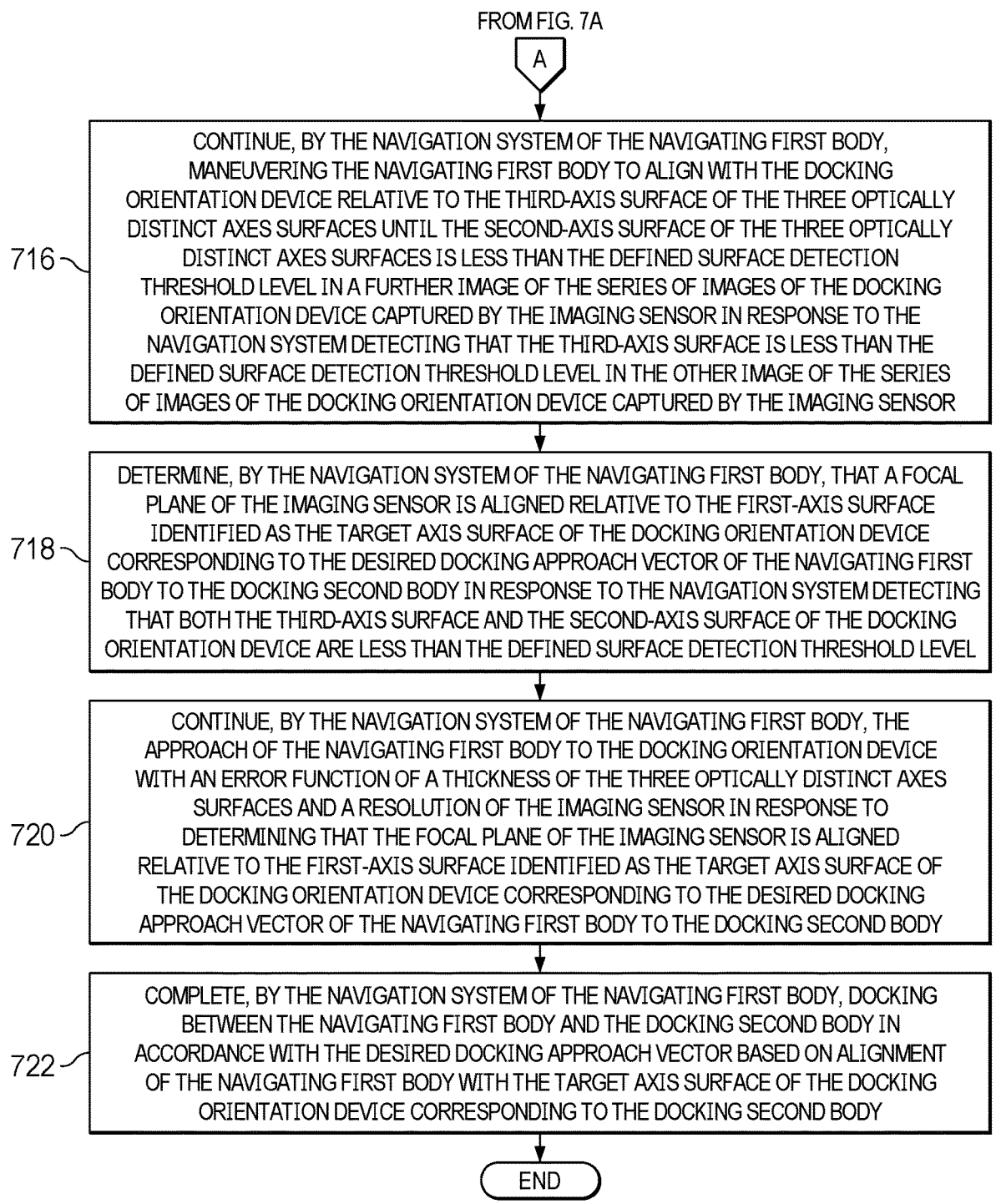

With reference now to FIGS. 7A-7B, a flowchart illustrating a process for autonomously aligning docking bodies is shown in accordance with an illustrative embodiment. The process shown in FIGS. 7A-7B may be implemented in a navigation system, such as, for example, navigation system 101 in FIG. 1 or navigation system 208 in FIG. 2. For example, the process shown in FIGS. 7A-7B may be implemented by docking code 200 in FIG. 1 or docking code 210 in FIG. 2.

The process begins when the navigation system of a navigating first body receives an indication that the navigating first body is approaching a docking orientation device corresponding to a docking second body (step 702). The docking orientation device has a three-dimensional geometric shape that includes three mutually orthogonal surfaces. Each respective surface of the three mutually orthogonal surfaces is optically distinct from each other. The navigation system of the navigating first body acquires the docking orientation device using an imaging sensor in response to the navigation system receiving the indication that the navigating first body is approaching the docking orientation device corresponding to the docking second body (step 704).

The navigation system of the navigating first body captures a series of images of the docking orientation device using the imaging sensor (step 706). The navigation system of the navigating first body guides the navigating first body in an approach to the docking orientation device until a desired maneuvering distance is achieved based on the series of images captured by the imaging sensor (step 708). The desired maneuvering distance is achieved when the docking orientation device captured in an image of the series of images is greater than or equal to a predefined optical percentage of the image.

The navigation system of the navigating first body identifies three optically distinct axes surfaces of the docking orientation device based on an optical distinctiveness of each respective surface of the three mutually orthogonal surfaces comprising the docking orientation device in response to achieving the desired maneuvering distance (step 710). In addition, the navigation system of the navigating first body identifies a first-axis surface of the three optically distinct axes surfaces that is a target axis surface corresponding to a desired docking approach vector of the navigating first body to the docking second body (step 712).

Further, the navigation system of the navigating first body maneuvers the navigating first body to align with the docking orientation device relative to a second-axis surface of the three optically distinct axes surfaces until a third-axis surface of the three optically distinct axes surfaces is less than a defined surface detection threshold level in another image of the series of images of the docking orientation device captured by the imaging sensor (step 714). Furthermore, the navigation system of the navigating first body continues maneuvering the navigating first body to align with the docking orientation device relative to the third-axis surface of the three optically distinct axes surfaces until the second-axis surface of the three optically distinct axes surfaces is less than the defined surface detection threshold level in a further image of the series of images of the docking orientation device captured by the imaging sensor in response to the navigation system detecting that the third-axis surface is less than the defined surface detection threshold level in the other image of the series of images of the docking orientation device captured by the imaging sensor (step 716). The navigation system of the navigating first body determines that a focal plane of the imaging sensor is aligned relative to the first-axis surface identified as the target axis surface of the docking orientation device corresponding to the desired docking approach vector of the navigating first body to the docking second body in response to the navigation system detecting that both the third-axis surface and the second-axis surface of the docking orientation device are less than the defined surface detection threshold level (step 718). However, it should be noted that an alternative illustrative embodiment can combine the delta of the first, second, and third axes (e.g., x, y, and z axes) into a single vector, moving the navigating first body from any location to align with an axis (or any other x, y, z position actually) all in one single movement. This process could potentially be iterative as well, providing more accuracy while the docking second body is moving.

The navigation system of the navigating first body continues the approach of the navigating first body to the docking orientation device with an error function of a thickness of the three optically distinct axes surfaces and a resolution of the imaging sensor in response to determining that the focal plane of the imaging sensor is aligned relative to the first-axis surface identified as the target axis surface of the docking orientation device corresponding to the desired docking approach vector of the navigating first body to the docking second body (step 720). The navigation system of the navigating first body completes docking between the navigating first body and the docking second body in accordance with the desired docking approach vector based on alignment of the navigating first body with the target axis surface of the docking orientation device corresponding to the docking second body (step 722). Thereafter, the process terminates.

Thus, illustrative embodiments of the present disclosure provide a computer-implemented method, navigation system, and computer program product for autonomously aligning docking bodies. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for autonomously aligning docking bodies, the computer-implemented method comprising:
    identifying, by a navigation system of a first body, a first-axis surface of three optically distinct axes surfaces of a docking orientation device that is a target axis surface corresponding to a desired docking approach vector of the first body to a second body;
    maneuvering, by the navigation system, the first body to align with the docking orientation device relative to a second-axis surface of the three optically distinct axes surfaces until a third-axis surface of the three optically distinct axes surfaces is less than a defined surface detection threshold level;
    continuing, by the navigation system, the maneuvering of the first body to align with the docking orientation device relative to the third-axis surface of the three optically distinct axes surfaces until the second-axis surface of the three optically distinct axes surfaces is less than the defined surface detection threshold level; and
    completing, by the navigation system, docking between the first body and the second body in accordance with the desired docking approach vector based on alignment of the first body with the target axis surface of the docking orientation device, the docking orientation device has a three-dimensional geometric shape that includes three mutually orthogonal surfaces, each respective surface of the three mutually orthogonal surfaces is optically distinct from each other.

2. The computer-implemented method of claim 1, further comprising:
    receiving, by the navigation system, an indication that the first body is approaching the docking orientation device corresponding to the second body;
    acquiring, by the navigation system, the docking orientation device using an imaging sensor; and capturing, by the navigation system, a series of images of the docking orientation device using the imaging sensor.

3. The computer-implemented method of claim 1, further comprising:
    guiding, by the navigation system, the first body in an approach to the docking orientation device until a desired maneuvering distance is achieved based on a series of images captured by an imaging sensor, the desired maneuvering distance is achieved when the docking orientation device captured in an image of the series of images is greater than or equal to a predefined optical percentage of the image.

4. The computer-implemented method of claim 1, further comprising: identifying, by the navigation system, the three optically distinct axes surfaces of the docking orientation device based on the optical distinctiveness of the each respective surface of the three mutually orthogonal surfaces comprising the docking orientation device.

5. The computer-implemented method of claim 1, further comprising:
    determining, by the navigation system, that a focal plane of an imaging sensor is aligned relative to the first-axis surface identified as the target axis surface of the docking orientation device corresponding to the desired docking approach vector of the first body to the second body in response to the navigation system detecting that the third-axis surface and the second-axis surface of the docking orientation device are less than the defined surface detection threshold level.

6. The computer-implemented method of claim 1, further comprising:
    continuing, by the navigation system, an approach of the first body to the docking orientation device with an error function of a thickness of the three optically distinct axes surfaces and a resolution of an imaging sensor.

7. The computer-implemented method of claim 1, wherein each respective surface of the three optically distinct axes surfaces of the docking orientation device is optically distinct from each other using at least one of different colors, patterns, graphics, designs, and pictures.

8. The computer-implemented method of claim 1, wherein optical distinction between the three optically distinct axes surfaces encodes navigation control information and other information that is revealed depending on an angle of view of a given surface of the three optically distinct axes surfaces of the docking orientation device.

9. The computer-implemented method of claim 1, wherein the navigation system utilizes holographic techniques to distinguish different surfaces of the docking orientation device.

10. The computer-implemented method of claim 1, wherein the docking orientation device is separate from the second body.

11. A navigation system for autonomously aligning docking bodies, the navigation system comprising:

a communication fabric;
a set of computer-readable storage media connected to the communication fabric, wherein the set of computer-readable storage media collectively stores program instructions; and
a set of processors connected to the communication fabric, wherein the set of processors executes the program instructions to:
identify a first-axis surface of three optically distinct axes surfaces of a docking orientation device that is a target axis surface corresponding to a desired docking approach vector of a first body to a second body;
maneuver the first body to align with the docking orientation device relative to a second-axis surface of the three optically distinct axes surfaces until a third-axis surface of the three optically distinct axes surfaces is less than a defined surface detection threshold level;
continue maneuvering of the first body to align with the docking orientation device relative to the third-axis surface of the three optically distinct axes surfaces until the second-axis surface of the three optically distinct axes surfaces is less than the defined surface detection threshold level; and
complete docking between the first body and the second body in accordance with the desired docking approach vector based on alignment of the first body with the target axis surface of the docking orientation device, the docking orientation device has a three-dimensional geometric shape that includes three mutually orthogonal surfaces, each respective surface of the three mutually orthogonal surfaces is optically distinct from each other.

12. The navigation system of claim 11, wherein the set of processors further executes the program instructions to:
receive an indication that the first body is approaching the docking orientation device corresponding to the second body;
acquire the docking orientation device using an imaging sensor; and
capture a series of images of the docking orientation device using the imaging sensor.

13. The navigation system of claim 11, wherein the set of processors further executes the program instructions to:
guide the first body in an approach to the docking orientation device until a desired maneuvering distance is achieved based on a series of images captured by an imaging sensor, the desired maneuvering distance is achieved when the docking orientation device captured in an image of the series of images is greater than or equal to a predefined optical percentage of the image.

14. The navigation system of claim 11, wherein the set of processors further executes the program instructions to:
identify the three optically distinct axes surfaces of the docking orientation device based on the optical distinctiveness of the each respective surface of the three mutually orthogonal surfaces comprising the docking orientation device.

15. A computer program product for autonomously aligning docking bodies, the computer program product comprising a set of computer-readable storage media having program instructions collectively stored therein, the program instructions executable by a navigation system to cause the navigation system to:
identify a first-axis surface of three optically distinct axes surfaces of a docking orientation device that is a target axis surface corresponding to a desired docking approach vector of a first body to a second body;
maneuver the first body to align with the docking orientation device relative to a second-axis surface of the three optically distinct axes surfaces until a third-axis surface of the three optically distinct axes surfaces is less than a defined surface detection threshold level;
continue maneuvering of the first body to align with the docking orientation device relative to the third-axis surface of the three optically distinct axes surfaces until the second-axis surface of the three optically distinct axes surfaces is less than the defined surface detection threshold level; and
complete docking between the first body and the second body in accordance with the desired docking approach vector based on alignment of the first body with the target axis surface of the docking orientation device, the docking orientation device has a three-dimensional geometric shape that includes three mutually orthogonal surfaces, each respective surface of the three mutually orthogonal surfaces is optically distinct from each other.

16. The computer program product of claim 15, wherein the program instructions further cause the navigation system to:
receive an indication that the first body is approaching the docking orientation device corresponding to the second body;
acquire the docking orientation device using an imaging sensor; and
capture a series of images of the docking orientation device using the imaging sensor.

17. The computer program product of claim 15, wherein the program instructions further cause the navigation system to:
guide the first body in an approach to the docking orientation device until a desired maneuvering distance is achieved based on a series of images captured by an imaging sensor, the desired maneuvering distance is achieved when the docking orientation device captured in an image of the series of images is greater than or equal to a predefined optical percentage of the image.

18. The computer program product of claim 15, wherein the program instructions further cause the navigation system to: identify the three optically distinct axes surfaces of the docking orientation device based on the optical distinctiveness of the each respective surface of the three mutually orthogonal surfaces comprising the docking orientation device.

19. The computer program product of claim 15, wherein the program instructions further cause the navigation system to:
determine that a focal plane of an imaging sensor is aligned relative to the first-axis surface identified as the target axis surface of the docking orientation device corresponding to the desired docking approach vector of the first body to the second body in response to the navigation system detecting that the third-axis surface and the second-axis surface of the docking orientation device are less than the defined surface detection threshold level.

20. The computer program product of claim 15, wherein the program instructions further cause the navigation system to:
continue an approach of the first body to the docking orientation device with an error function of a thickness of the three optically distinct axes surfaces and a resolution of an imaging sensor.

* * * * *